(12) United States Patent
Panicker et al.

(10) Patent No.: US 6,623,180 B2
(45) Date of Patent: Sep. 23, 2003

(54) HIGH FREQUENCY OPTICAL MODULE AND METHOD OF MAKING SAME

(75) Inventors: Ram Panicker, Camarillo, CA (US); Ivair Gontijo, Los Angeles, CA (US); Yet-Zen Liu, Westlake Village, CA (US); Kirit Dharia, Thousand Oaks, CA (US); Robert Franks, Thousand Oaks, CA (US); Gary Lee Gutierrez, Newbury Park, CA (US)

(73) Assignee: GTRAN, Inc., Newbury Park, CA (US)

( * ) Notice: Subject to any disclaimer, the term of this patent is extended or adjusted under 35 U.S.C. 154(b) by 0 days.

(21) Appl. No.: 10/046,371

(22) Filed: Oct. 19, 2001

(65) Prior Publication Data

US 2003/0077053 A1 Apr. 24, 2003

(51) Int. Cl.[7] ................................................. G02B 6/36
(52) U.S. Cl. .............................. 385/92; 385/88; 385/94
(58) Field of Search ............................... 385/88–94, 49; 372/6, 36, 34; 257/80–82, 431–433; 354/152

(56) References Cited

U.S. PATENT DOCUMENTS 4,553,813 A * 11/1985 McNaughton et al. ........ 385/89
4,997,252 A *  3/1991 Sugawara et al. ........... 359/115
5,707,575 A *  1/1998 Litt et al. .................... 264/104
5,787,215 A *  7/1998 Kuhara et al. ................ 385/88
6,036,375 A *  3/2000 Yanagisawa et al. ......... 385/94

FOREIGN PATENT DOCUMENTS

JP     10170771 A * 6/1998 ............ G02B/6/42

* cited by examiner

Primary Examiner—Hemang Sanghavi
Assistant Examiner—Scott A Knauss
(74) Attorney, Agent, or Firm—T J Singh, Klein, O'Neill & Singh (57) ABSTRACT

One embodiment of the present invention provides a module including a primary substrate defining a base of the module, wherein the primary substrate is provided with a plurality of vias for electrical connection to a photodetector located within an interior portion of the module; a side wall member joined to the primary substrate to form side walls of the module and to define the interior portion of the module; a secondary substrate positioned within the interior portion of the module, the photodetector being mounted on the secondary substrate; an optical fiber guide extending into the interior portion of the module from outside the module, the optical fiber being arranged to receive an optical fiber and to position the optical fiber so that light emerging from the optical fiber impinges upon the photodetector; and a lid joined to the side wall member to enclose the interior portion of the module.

17 Claims, 6 Drawing Sheets

HIGH FREQUENCY OPTICAL MODULE AND METHOD OF MAKING SAME

BACKGROUND OF THE INVENTION

1. Field of the Invention

This invention pertains to hermetic packages for microelectronic circuits and methods of making them. In particular, it relates to a highly integrated optical modules for high (10 Gbps and higher) data rates.

2. Background of the Invention

Figure 1:
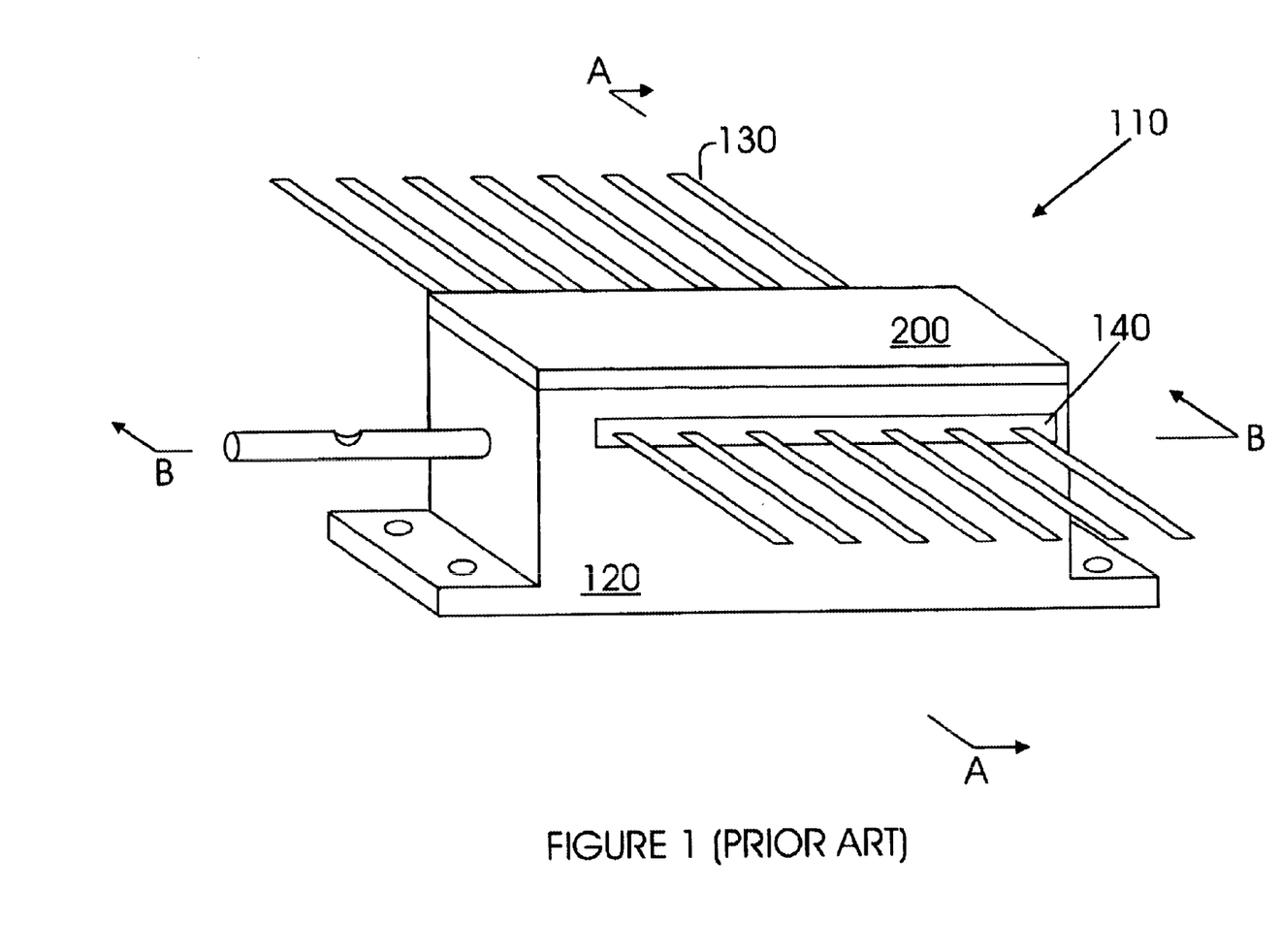
FIG. 1 is a perspective view of a conventional butterfly module.
Figure 2:
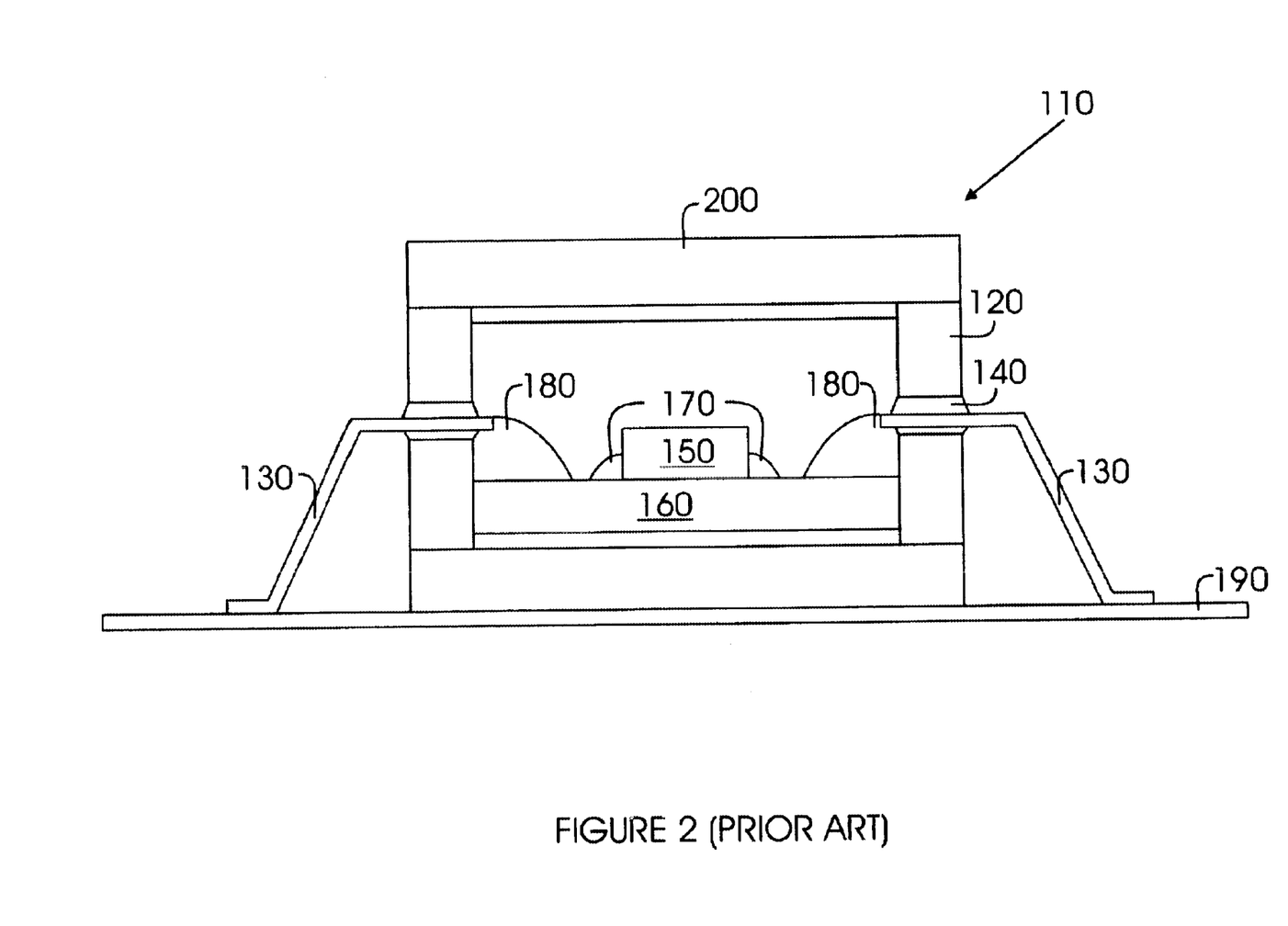
FIG. 2 is an end-on cut away elevation of the conventional module that uses glass-to-metal seals for electrical feedthroughs.

Currently, modules for high frequency signals are typically configured as illustrated in FIGS. 1 and 2. FIG. 1 is a perspective view of a conventional module 110 having a "butterfly" configuration. The housing 120 for the module 110 is generally comprised of metal. Holes are drilled through the housing 120 and electrical feedthroughs 130 are inserted in through the holes. The holes are then sealed to isolate the feedthroughs from the housing by firing them at high temperature using a glass material to form a glass-to-metal seal 140 (see FIG. 2). Alternatively, this could be made by high-temperature co-fired ceramic typically consisting of alumina.

As shown in FIG. 2, which is an end-on elevation of the module 110 shown in FIG. 1 taken along line A—A of FIG. 1, a device 150 to be placed inside the module 110 is mounted on a substrate 160 and electrical interconnections 170 are made between the device 150 and substrate 160. The substrate 160 is then positioned within the module 110. Electrical connections 180 interconnect the electrical feedthroughs 130 with the substrate 160 and hence to the device 110. The module 110 is then sealed with a lid 200. Ultimately, the module 110 is placed on and mechanically fastened to a PC board 190 in a known fashion, e.g., through the use of mechanical fasteners through a flange in the module or by cutting a hole in the PC board 190, and placing the module 110 in it. The electrical feedthroughs 130 are then soldered down to the traces on PC board 190. Typically an angled fiber is optically coupled to the photo-detector that is positioned parallel to the angled fiber to receive the optical data stream. Standard transistor out line (TO) packages and dual in line (DIL) packages are also used.

While modules of the configuration shown in FIGS. 1–2 are generally suitable for their intended purpose, they are not without drawbacks. For example, the packages are bulky and cannot be surface mounted. Cavities need to be cut in the PC board to accept the module in order to bring the leads 130 in line with the board so that they can be solder connected. In packages such as DILs the leads must be formed in order to connect to the pc board. The rotational alignment of the angled fiber is cumbersome and increases assembly cost.

Another drawback of a module such as that depicted in FIG. 2 is that a connector such as a K connector is used. This further increases the height of the module because it should be at least as high as the connector.

Another drawback of a module such as that depicted in FIG. 2 is that it may necessitate the use of metal flanges with holes to permit mechanical fastening of the module to the PC board.

Yet another drawback is the very high cost of these packages.

SUMMARY OF THE INVENTION

One embodiment of the present invention provides a module including a primary substrate defining a base of the module, wherein the primary substrate is provided with a plurality of vias for electrical connection to a photodetector located within an interior portion of the module; a side wall member joined to the primary substrate to form side walls of the module and to define the interior portion of the module; a secondary substrate positioned within the interior portion of the module, the photodetector being mounted on the secondary substrate; an optical fiber pipe extending into the interior portion of the module from outside the module, the optical fiber pipe being arranged to receive an optical fiber and to position the optical fiber so that light emerging from the optical fiber impinges upon the photodetector; and a lid joined to the side wall member to hermetically enclose the interior portion of the module.

In an embodiment, the primary substrate is comprised of a ceramic material and the vias are comprised of a metallic material, such as a copper-tungsten alloy. In an embodiment, the secondary substrate is comprised of aluminum nitride. In an embodiment, the secondary substrate is placed in a cut-out region of the primary substrate and can carry circuit distribution lines.

In an embodiment, the module also includes an amplifier, such as a trans-impedance amplifier, mounted on the secondary substrate and electrically connected to the photodetector through circuit distribution lines on the secondary substrate. In an embodiment, the photodetector generates a current signal in response to light from the optical fiber impinging on the photodetector, and wherein the circuit distribution lines carry the current to the amplifier.

In an embodiment, the optical fiber pipe extends through the side wall member into the interior portion of the module from outside the module. In an embodiment, the lid comprises a ceramic material, and wherein the optical fiber pipe extends through the lid into the interior portion of the module from outside the module.

BRIEF DESCRIPTION OF THE DRAWINGS

These and other features and advantages of the invention will be readily appreciated from the following written description read in conjunction with the drawings, in which.

DETAILED DESCRIPTION

Figure 3:
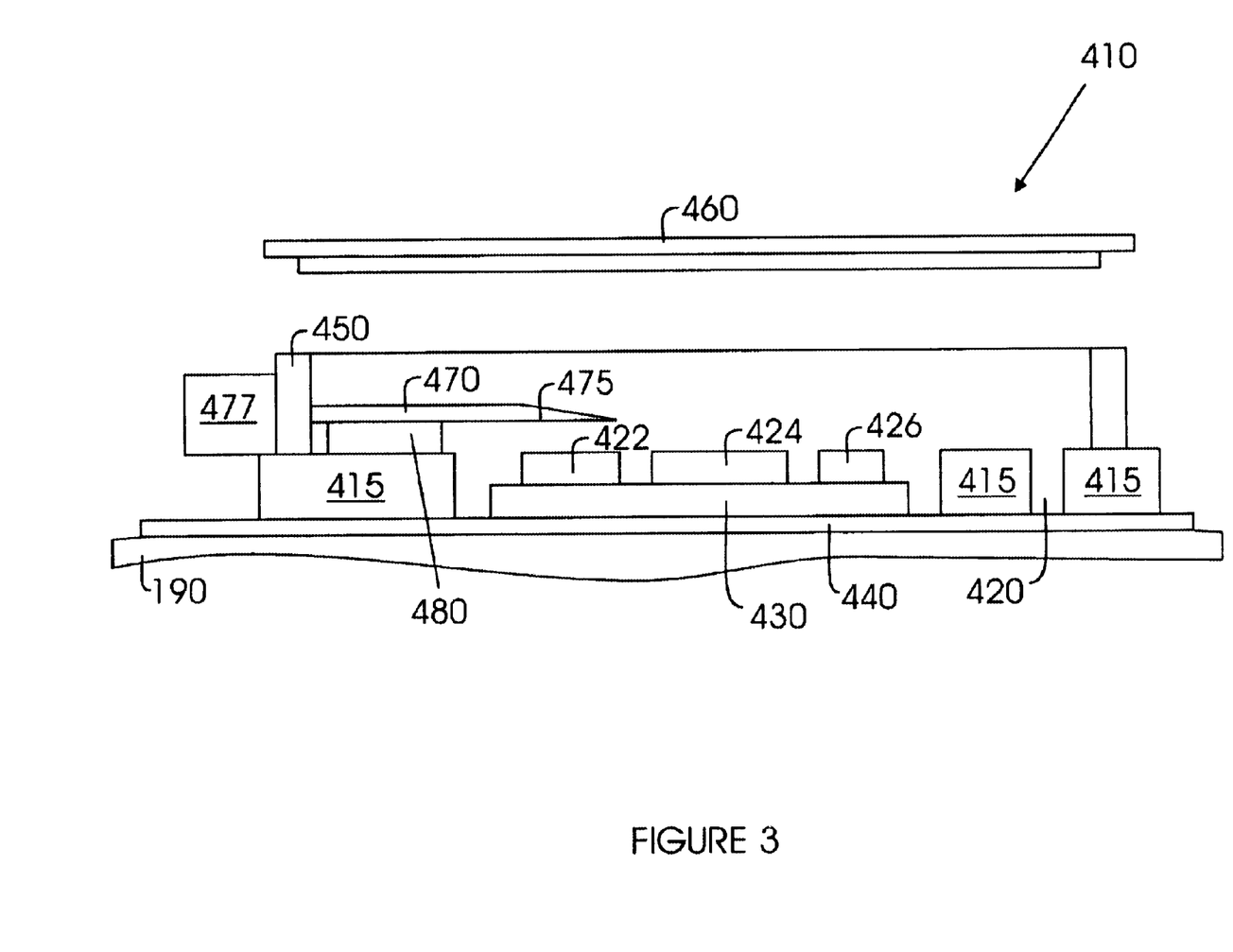
FIG. 3 is a side cut away elevation of a module for high frequency signals in accordance with an embodiment of the invention.

FIG. 3 is a side cut away elevation of a module for high frequency signals in accordance with another embodiment of the invention. The module 410 illustrated in FIG. 3 is a surface mount module were leads come from the bottom of the package with high-speed RF and other connections being made through electrically conducting vias in the ceramic substrate that forms the base of the module 410.

Specifically, in FIG. 3, element 415 is a substrate. In one embodiment, the substrate 415 is a ceramic material, such as alumina. Numeral 420 designates an area where a via 420 passes through the substrate 415 to permit electrical connection to a series of components 422, 424, and 426. In one embodiment, the via is preferably made of a copper-tungsten alloy.

These components are all assembled on a secondary substrate 430. In an embodiment, the secondary substrate is made of aluminum nitride. The secondary substrate 430 is placed in a cut-out region of the substrate 415 and carries the circuit distribution lines. This enables the assembly and testing of the components prior to "committing to the package," i.e., prior to placing them in the module 410 and connecting them in. The secondary substrate 430 also provides for more efficient heat dissipation.

Figure 6:
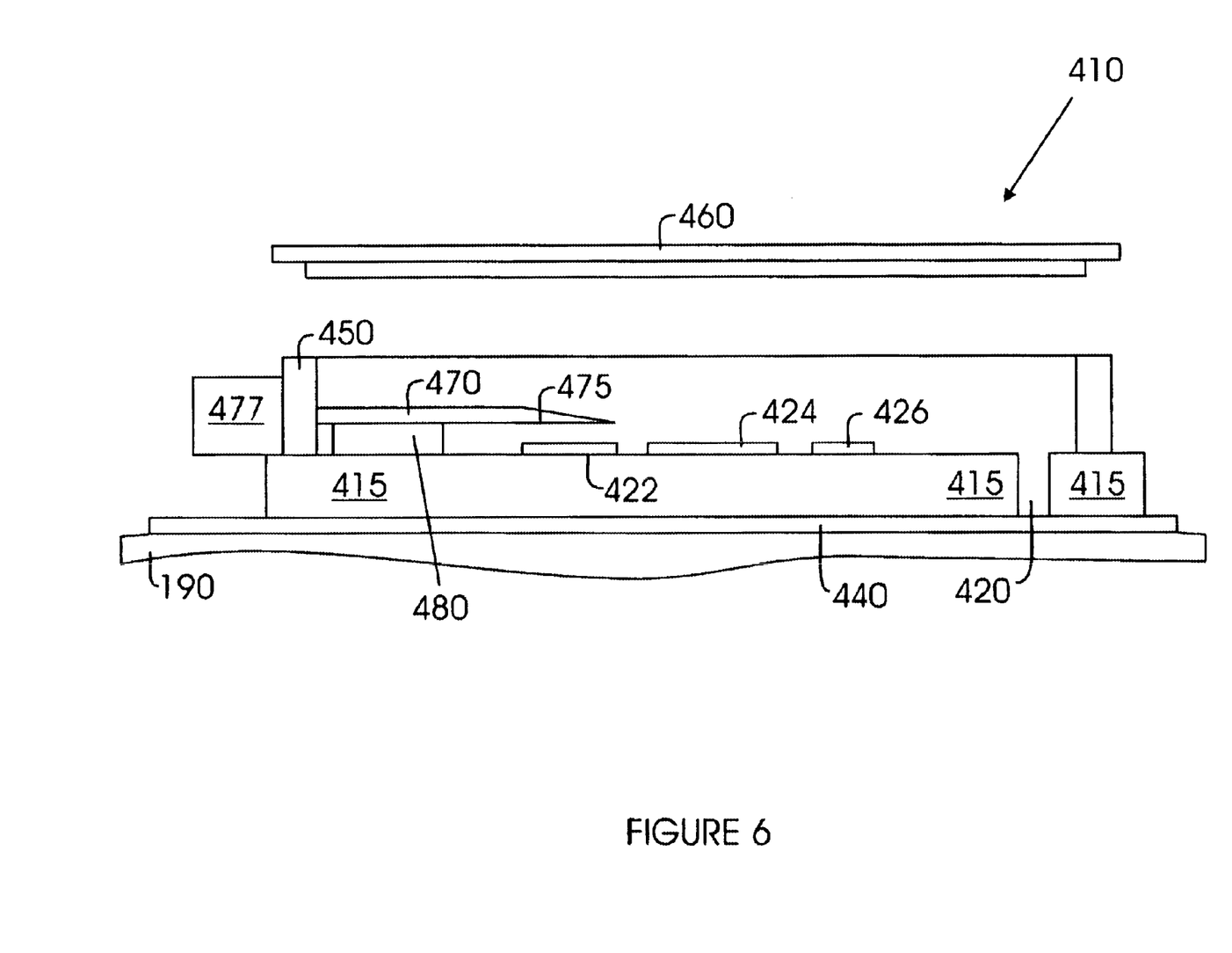
FIG. 6 is a cut away elevation of a module for high frequency signals in accordance with an embodiment of the invention.

In another embodiment, the secondary substrate 430 is eliminated and all the devices and wirings are incorporated directly onto substrate 415 as shown in FIG. 6.

The ceramic substrate may be manufactured in a variety of techniques known in the art. For example, general background information on substrate formation is available from U.S. Pat. No. 4,942,076, issued Jul. 17, 1990 and entitled "Ceramic Substrate With Metal Filled Via Holes For Hybrid Microcircuits And Method Of Making The Same" the disclosure of which is incorporated herein by reference. Such information is also available from U.S. Pat. No. 5,089,881, issued Feb. 18, 1992 and entitled "Fine-Pitch Chip Carrier", the disclosure of which is also incorporated by reference. Also incorporated by reference is the disclosure of U.S. Pat. No. 5,707,575, issued Jan. 13, 1998 and entitled "Method For Filling Vias In Ceramic Substrates With Composite Metallic Paste."

In the embodiment illustrated in FIG. 3, these components 422, 424, and 426 are a photodetector 422, a TIA 424, and a limiting amplifier 426, respectively. In one example, the photodetector 422 is a conventional PIN diode. Light falling on the photodetector 422 from an input fiber 470 with an angled end 475 causes the photodetector 422 to generate a microcurrent. This microcurrent is conducted to the TIA 424 which converts it to a voltage that is then conveyed by a wire on the substrate to the limiting amplifier 426 which produces the signal that is used as the output signal.

A lead frame 440 is positioned beneath the ceramic substrate 315. Typically, the lead frame 440 is made of a metallic material. In one embodiment, it is made of an iron-based alloy with nickel and cobalt commercially known as Kovar (ASTM F15). Also, a lid 460 is provided over the enclosure 450. In one embodiment, the enclosure 450 and the lid 460 are also made of Kovar.

The embodiment shown in FIG. 3 also includes an optical fiber 470. The optical fiber 470 is brought in through a hole drilled in the enclosure 450. A guide pipe 477 is placed in the hole and the optical fiber 470 is inserted through the guide pipe 477. In another embodiment, this arrangement can be replaced with a ceramic lid with a hole to guide in the fiber.

The optical fiber 470 has an angled end 475. Light propagating within the optical fiber 470 strikes the angled end 475 where it undergoes total internal reflection to exit the optical fiber 470 through the side and impinge upon the photodetector 422. A support 480 supports the fiber 470. In one embodiment, the support 480 may be made out of silicon and may be provided with a v-groove.

A plated, stepped metal lid 460 is then welded or soldered to the top of a side wall member of the enclosure 450 to hermetically enclose the module 410. In another embodiment, a formed ceramic or plastic lid with a relief to include the fiber 470 can be used to enclose the assembly.

In one example such as that described, the vias 420 are made of tungsten copper and form the electrical connection between components external to the module 410 and the components inside the module 410. Thus, the use of feedthroughs and glass-to-metal seals for insulating the feedthroughs from the module housing may be avoided.

In the embodiment employing an optical fiber 470 having an angled end 475, light coming through the optical fiber 470 is totally internally reflected and impinges upon the photodetector 422. In order for such an arrangement to work efficiently, it is necessary to maximize the amount of light which reaches the photodetector 422 from the fiber. This means that the optical fiber 470 must be positioned precisely above the photodetector 422. It also means that the angled end of the fiber has to be aligned quite precisely rotationally.

Figure 4:
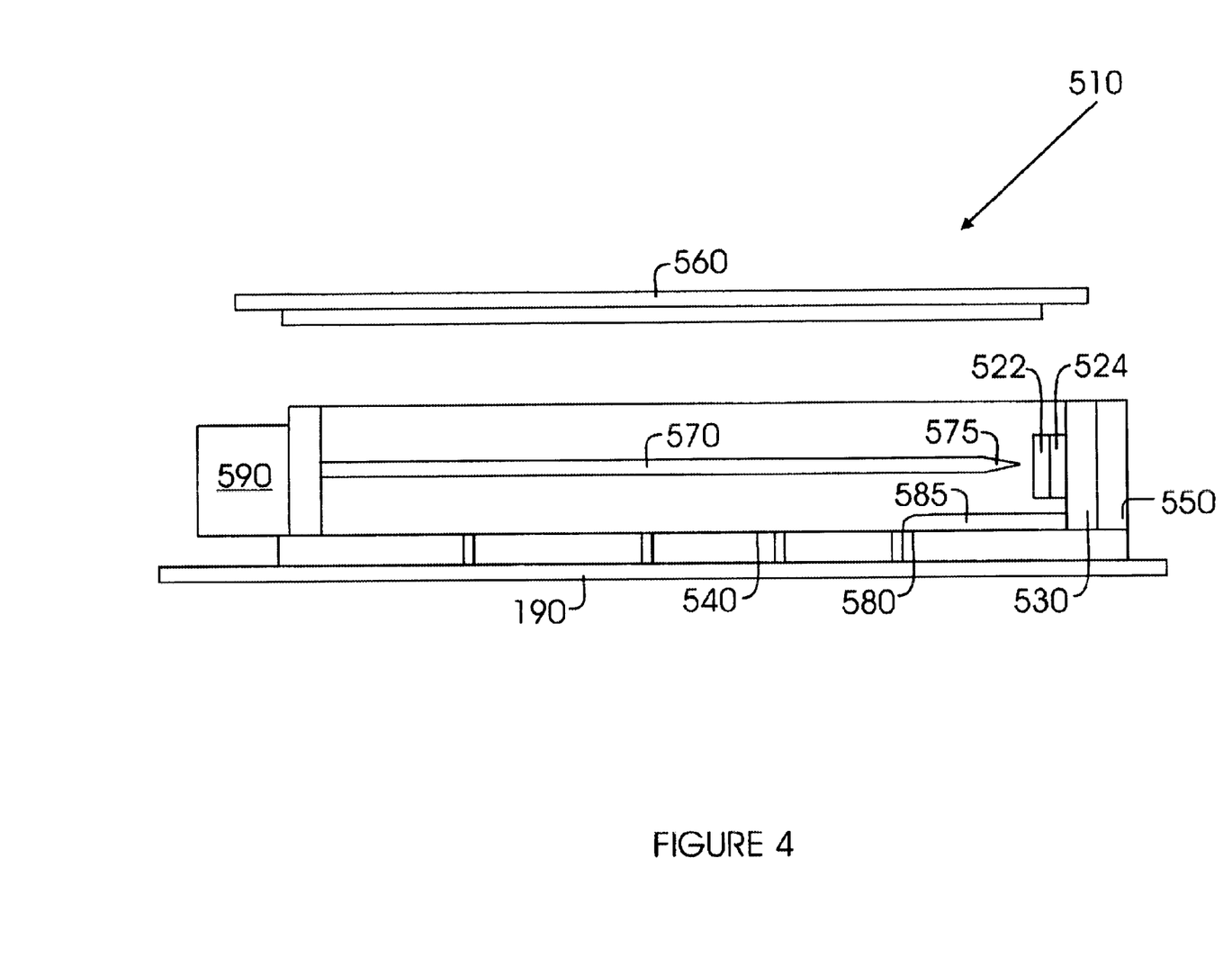
FIG. 4 is a side cut away elevation of a module for high frequency signals in accordance with an embodiment of the invention.

Accordingly, the embodiment shown in FIG. 4 includes an optical fiber 570 held perpendicularly with respect to a detector 522. More specifically, in the embodiment depicted in FIG. 4, a photodetector 522 is attached directly to a TIA 524, using a known "flipchip" type of connection thereby eliminating bond wires, which can provide for cleaner signals. In another embodiment, the photodetector 522 can be mounted adjacent to the TIA 524. In one example, the photodetector 522 is connected to the TIA 524 through wire or ribbon bonds.

Light pulses from the optical fiber 570 impinge directly on the photodetector 522 through a lens-shaped fiber 575. The lens-shaped fiber tip 575 focuses the beam of light emerging from the optical fiber 570. This can increase photon density and thus, signal strength. The cone-shaped or lens-shaped fiber tip 575 can reduce or eliminate the need for cumbersome rotational alignment of the optical fiber 570 with respect to the photodetector 522.

In another embodiment, the end of the optical fiber 570 can be cleaved at a desired angle to focus the beam of light.

The embodiment shown in FIG. 4 can also incorporate a limiting amplifier within the module 510 if needed. The TIA 524 and limiting amplifier would be connected through transmission lines on the alumina substrate 530. It is also possible to integrate the limiting amplifier into the TIA 524.

Instead of a K-type connector, module 510 uses connections through vias 580 to convey signals to and from components within the module 510. The signals and DC connections are brought to the leads through electrically conducting vias in the alumina substrate 530. The leads, a side wall member 550, and a fiber input pipe 590 are simultaneously brazed onto the alumina substrate 540 using a suitable alloy, for example, Cu—Ag. In an embodiment, the brazed module 510 is then plated with nickel and gold.

As in the previous embodiment, the TIA 524 and any limiting amplifier are mounted directly onto the secondary substrate 530 which is typically made of a ceramic material. The secondary substrate 530 acts as a heat spreader and, in an embodiment, can be made of aluminum nitride, Cu—W or Cu—Mo—Cu. The devices (photodetector 522, TIA 524, and any limiting amplifier) may be attached to the heat spreader/secondary substrate 530 using known attachment methods, such as epoxy or low temperature alloys. In this example, the alumina substrate 540 with the transmission lines 585 is attached to the lead frame 190 along with the side wall member 550 using a high temperature braze process. The device subassembly is then mounted vertically, preferably onto an inside wall of the module 510, using known attachment methods such as screws, epoxy, or low temperature alloys.

In an embodiment, the optical fiber 570 is connected to the module 510 through a fiber input pipe 590 and aligned so that will focus on the photodetector 522 which, as mentioned, can be self standing or connected to the TIA 524 using a flip chip connection. A plated, stepped metal lid 560 is then welded or soldered to the top of the seal ring 550 to hermetically enclose the module 510. In another embodiment, a formed ceramic or plastic lid with a relief to include the fiber 570 can be used to enclose the assembly.

Figure 5:
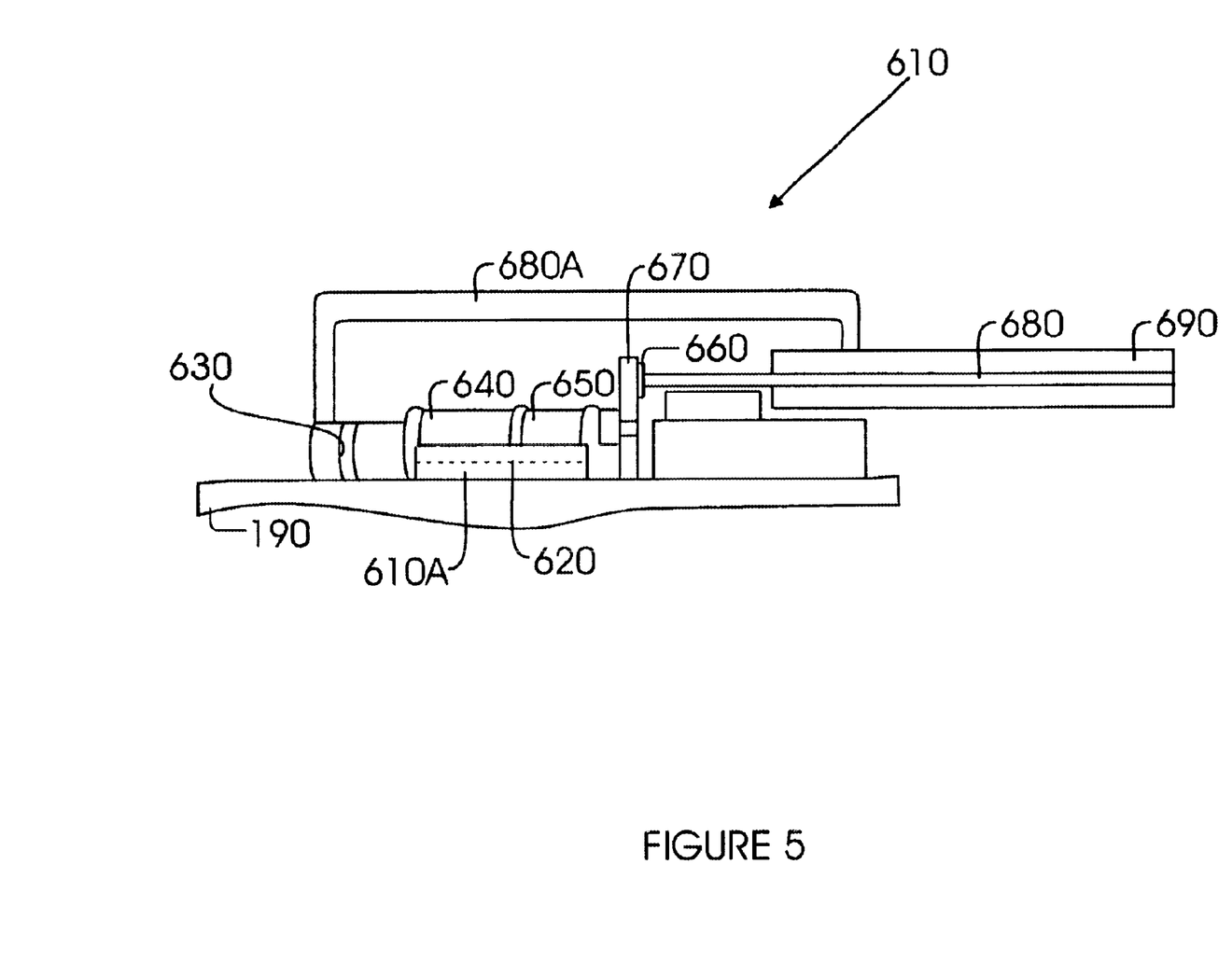
FIG. 5 is a side cut away elevation of a module for high frequency signals in accordance with an embodiment of the invention.

FIG. 5 is a side cut away elevation of a module for high frequency signals in accordance with an embodiment of the invention. In the embodiment depicted in FIG. 5, a photodetector 660 is vertically mounted on a photodiode mount 670. The photodiode mount 670 is connected to a TIA 650, typically through wire or ribbon bonds. Light pulses from the optical fiber 680 impinge directly on the photodetector 522, which can increase photon density and thus, signal strength. Optical fiber 680 is enclosed within fiber tube 690.

The embodiment shown in FIG. 5 can also incorporate a limiting amplifier 640 within the module 610 if needed. The TIA 650 and limiting amplifier 640 would be connected through transmission lines on an alumina substrate 610A. It is also possible to integrate the limiting amplifier 640 into the TIA 524.

Instead of a K— type connector, module 510 uses connections through via 630 to convey signals to and from components within the module 610. The signals and DC connections are brought to the leads through electrically conducting vias in the alumina substrate 610A. The leads are brazed onto the alumina substrate 610A using a suitable alloy, for example, Cu—Ag. In an embodiment, the brazed module is then plated with nickel and gold.

As in the previous embodiment, the TIA 650 and any limiting amplifier 640 are mounted directly onto the secondary substrate 620 through cavities in the secondary substrate 620, which is typically made of a ceramic material. The secondary substrate 620 acts as a heat spreader and, in an embodiment, can be made of aluminum nitride, Cu—W or Cu—Mo—Cu. The devices (photodetector 660, TIA 650, and any limiting amplifier 640) may be attached to the heat spreader/secondary substrate 620 using known attachment methods, such as epoxy or low temperature alloys. In this example, the alumina substrate 610A with the transmission lines 585 is also soldered or epoxy attached to the heat spreader.

In this embodiment, a formed ceramic lid 680A is then welded or soldered to the top of the 630 via to hermetically enclose the module 610. In another embodiment, the lid 680A can comprise plastic or drawn from metal. Thus, a single part lid 680A can enclose the assembly, rather than other coverings that might include metal Kovar rings or stepped lid enclosures. The lid can be attached using epoxy also.

In another embodiment, the secondary substrate 620 and the cavity in alumina substrate 610A are eliminated. Instead, the transmission lines are placed on alumina substrate 610A without the cavity and the devices (photodetector 660, TIA 650 and the limiting amplifier 640) are placed directly over the alumina substrate 610A or on a metal pedestal on top of alumina substrate 610A, or a combination thereof.

A module of the present invention provides for a substantial size reduction better signals/noise ratio due to improve to optical efficiency as compared to conventional modules. Also, flip chip mounting the detector on the TIA provides a cleaner signal due to reduced electrical parasitics.

In addition, a module of the present invention allows devices within the substrate to be tested before committing to the module. Also, the embodiment of a module as that shown in FIG. 4 eliminates the need for rotational alignment of the fiber, thus facilitating assembly. Thus, a module according to the present invention is potentially scalable to 40 Gbps.

The invention has been described above the connection with specific embodiments for the purposes of illustration only. One of ordinary skill in the art will readily appreciate that the basic teachings of the invention can be embodied in other ways. Thus, the invention should not be considered to be limited to the specific embodiments disclosed herein, but instead should be considered to be fully commensurate in scope with the following claims.

What is claimed is:

1. A method of fabricating a module comprising the steps of:

assembling an electronic component to a secondary substrate member to form a first subassembly;

attaching a primary substrate to a side wall member to create a second subassembly;

placing the first subassembly into the second subassembly;

making electrical connections to the electronic component on the secondary substrate through vias in the primary substrate;

attaching a guide for guiding an optical fiber into an interior of the module so that light emerging from the optical fiber impinges on the electronic component;

attaching a lid member to the side wall member to seal the module; and wherein the electronic component generates a current signal in response to light from the optical fiber impinging on the electronic component, and wherein the circuit distribution lines carry the current to an amplifier.

2. The method of claim 1 wherein the amplifier is a trans-impedance amplifier.

3. A method of fabricating a module comprising the steps of:

assembling an electronic component to a secondary substrate member to form a first subassembly;

attaching a primary substrate to a side wall member to create a second subassembly;

placing the first subassembly into the second subassembly;

making electrical connections to the electronic component on the secondary substrate through vias in the primary substrate;

attaching a guide for guiding an optical fiber into an interior of the module so that light emerging from the optical fiber impinges on the electronic component; and attaching a lid member to the side wall member to seal the module, wherein the lid member comprises a ceramic material, and wherein the optical fiber guide extends through the lid into the interior of the module from outside the module.

4. A method of fabricating a module comprising the steps of:

attaching a first electronic component to a second electronic component in a flip-chip configuration to produce a first electronic subassembly;

assembling the first electronic subassembly to a secondary substrate member to form a second subassembly;

attaching a primary substrate to a side wall member to create a module subassembly;

vertically mounting the second subassembly into the module subassembly;

making electrical connections to the first electronic subassembly on the secondary substrate through vias in the primary substrate;

attaching a guide for guiding an optical fiber into an interior of the module so that light emerging from the optical fiber impinges on the first electronic subassembly; and attaching a lid member to the side wall member to seal the module.

5. The method of claim 4 wherein the guide is attached to the interior of the module using a brazing operation.

6. The method of claim 4 wherein the step of assembling the first electronic subassembly to a secondary substrate member to form a second subassembly is performed by assembling the first electronic subassembly to the secondary substrate using epoxy.

7. The method of claim 4 wherein the step of assembling the first electronic subassembly to a secondary substrate member to form a second subassembly is performed by assembling the first electronic subassembly to the secondary substrate using a low temperature alloy.

8. The method of claim 4 wherein the primary substrate is comprised of a ceramic material.

9. The method of claim 4 wherein the vias are comprised of a metallic material.

10. The method of claim 9 wherein the metallic material is a copper tungsten alloy.

11. The method of claim 4 wherein the secondary substrate is comprised of aluminum nitride.

12. The method of claim 4 wherein the secondary substrate is placed in a cut-out region of the primary substrate.

13. The method of claim 4 wherein the secondary substrate carries circuit distribution lines.

14. The method of claim 4 wherein the first electronic subassembly generates a current signal in response to light from the optical fiber impinging on the electronic component, and wherein the circuit distribution lines carry the current to an amplifier.

15. The method of claim 14 wherein the amplifier is a trans-impedance amplifier.

16. The method of claim 4 wherein the optical fiber guide extends through the side wall member into the interior portion of the module from outside the module.

17. The method of claim 4 wherein the lid member comprises a ceramic material, and wherein the optical fiber guide extends through the lid into the interior of the module from outside the module.

* * * * *